(12) United States Patent
Aridome et al.

(10) Patent No.: US 7,835,436 B2
(45) Date of Patent: Nov. 16, 2010

(54) VIDEO-ENCODING DEVICE AND VIDEO-ENCODING CONTROL METHOD

(75) Inventors: Kenichiro Aridome, Kanagawa (JP); Hironobu Miyazaki, Tokyo (JP); Yukio Isobe, Kanagawa (JP)

(73) Assignee: Sony Corporation, Tokyo (JP)

( * ) Notice: Subject to any disclaimer, the term of this patent is extended or adjusted under 35 U.S.C. 154(b) by 1561 days.

(21) Appl. No.: 10/538,086

(22) PCT Filed: Oct. 29, 2004

(86) PCT No.: PCT/JP2004/016472

§ 371 (c)(1),
(2), (4) Date: Jun. 8, 2005

(87) PCT Pub. No.: WO2005/041582

PCT Pub. Date: May 6, 2005

(65) Prior Publication Data

US 2006/0050778 A1 Mar. 9, 2006

(30) Foreign Application Priority Data

Oct. 29, 2003 (JP) ............................. 2003-369388

(51) Int. Cl.
*H04N 7/12* (2006.01)
*H04N 5/92* (2006.01)
(52) U.S. Cl. ................................. 375/240.01; 386/111
(58) Field of Classification Search ............... 348/584, 348/222, 207, 232, 239, 722, 845.1, 845.2, 348/461, 463, 464, 500, 423, 515; 386/126, 386/46, 95, 98, 111, 112, 125, 106, 52
See application file for complete search history.

(56) References Cited

U.S. PATENT DOCUMENTS 5,854,873 A * 12/1998 Mori et al. .................. 386/92

(Continued)

FOREIGN PATENT DOCUMENTS

EP 0 847 195 B1 4/1999

(Continued)

OTHER PUBLICATIONS

Australian Patent Office Search Report, Dated Nov. 24, 2005.

(Continued)

*Primary Examiner*—Behrooz Senfi
(74) *Attorney, Agent, or Firm*—Rader, Fishman & Grauer PLLC

(57) ABSTRACT

A video-encoding device that can achieve seamless connection without causing an error in a VBV buffer is provided. Recording-mode determination means for determining an initial value of the occupied amount of a virtual buffer based on a determination result relating to seamless connection between a preceding chapter and the following chapter that are included in video signals, occupied-amount update means for updating the occupied amount of the virtual buffer, optimum-occupied-amount calculation means for calculating a predetermined optimum occupied amount based on the updated occupied amount of the virtual buffer, target-code-amount calculation means for calculating a predetermined target-code amount based on the video signals of the following chapter, target-code-amount adjustment means for adjusting the target code amount so that the sum total of the occupied amount of the virtual buffer and the target code amount does not exceed the optimum occupied amount, and encoding means for performing the encoding according to the adjusted target code amount are provided.

8 Claims, 10 Drawing Sheets

U.S. PATENT DOCUMENTS

| | | | |
|---|---|---|---|
| 5,949,487 A * | 9/1999 | Blanchard | 348/403.1 |
| 6,356,178 B1 * | 3/2002 | Isozaki | 386/109 |
| 6,381,398 B1 * | 4/2002 | Yamauchi et al. | 386/52 |
| 7,349,474 B2 * | 3/2008 | Bagni et al. | 375/240.15 |
| 2001/0033533 A1 * | 10/2001 | Fujinami et al. | 369/47.28 |
| 2002/0037161 A1 * | 3/2002 | Sugahara et al. | 386/111 |
| 2003/0154687 A1 * | 8/2003 | Sugahara et al. | 52/750 |
| 2004/0247296 A1 * | 12/2004 | Nakatani et al. | 386/96 |
| 2007/0047661 A1 * | 3/2007 | Yoshinari | 375/240.25 |

FOREIGN PATENT DOCUMENTS

| | | |
|---|---|---|
| EP | 0 742 993 B1 | 4/2000 |
| EP | 1 085 513 A2 | 3/2001 |
| JP | 09-509551 | 9/1997 |
| JP | 11-004445 | 1/1999 |
| JP | 11-112947 | 4/1999 |
| JP | 11-155131 | 6/1999 |
| JP | 2001-160945 | 6/2001 |
| WO | WO-97/13361 | 4/1997 |

OTHER PUBLICATIONS

Australian Patent Office Written Opinion, Dated Nov. 24, 2005.
International Search Report mailed Dec. 14, 2004.
International Preliminary Report for International Application No. PCT/JP2004/016472 dated Aug. 3, 2006.

* cited by examiner

VIDEO-ENCODING DEVICE AND VIDEO-ENCODING CONTROL METHOD

TECHNICAL FIELD

The present invention relates to a video-encoding device for encoding a video signal and particularly relates to a video-encoding device that controls the amount of codes generated from a following chapter, where seamless connection between chapters is performed, a video-encoding control device, and a video-encoding control method and a program for making a computer execute the method.

BACKGROUND ART

In recent years, optical disks have received attention, as recording mediums that can store video data and audio data. The optical disk is used, not only as a medium used for a contents commodity such as a movie, but also as a writable medium used for recording data on the user side. For example, the DVD standard that allows onetime recording of data onto one and the same area, the DVD-RW standard that allows rewriting data repetitively, and so forth are known, as the rewritable medium. The DVD-Video standard used for a reproduce-only disk is known, as the file format of the above-described optical mediums. However, data can be written onto the writable medium in keeping with the DVD-Video standard.

The DVD-Video standard allows recording to a maximum of ninety nine titles per disk. Further, each of the titles can include to a maximum of ninety-nine chapters (PTT: Part of Title). In the case where data is recorded onto the above-described DVD-R and DVD-RW through a camcorder: camera and recorder, a single recording unit from the start of recording to the end of recording is recorded, as a chapter. Further, the single recording unit is recorded, as one and the same title until predetermined condition is satisfied. The predetermined condition for closing the title is, for example, that the disk is ejected, the number of chapters of the title reaches ninety-nine, the number of cells of the title reaches ninety-nine, the transition from video recording to still-image recording occurs, etc.

In the case where the data that is recorded on a chapter-by-chapter basis in the above-described manner is reproduced, a display image is interrupted for a moment due to a minute gap that occurs between chapters. In average, the recording unit of the camcorder is about from a little over ten seconds to several tens of seconds. It is not desirable that a reproduced image is interrupted for each recording unit.

Therefore, there have been proposed technologies for achieving seamless connection that allows connecting video streams to one another without no interruptions to be seen therebetween (For example, refer to Japanese Unexamined Patent Application Publication No. 11-155131 (FIG. 25).).

According to the above-described known technology, where partial sections of a video object are coupled to one another, a VOBU including picture data at the end of the partial section and a VOBU including picture data at the leading end of the same are read from an optical disk, and the VOBUs are divided into a plurality of audio packs and a plurality of video packs. Then, the video packs are re-encoded and part of the plurality of audio packs is multiplexed into a subsequent section. That is to say, an output stream must be remultiplexed.

On the other hand, the MPEG-2 (Moving Picture Experts Group phase 2) standard is used, in the case where video encoding is performed for performing recording compliant with the DVD-Video standard. According to the MPEG-2 standard, however, a virtual buffer referred to as a VBV (refer to Video Buffering Verifier: ISO13818-2 Annex C) is expected to be provided between an encoder and a decoder, and encoding must be performed so that no errors occur in the VBV buffer. When trying to achieve the seamless connection between video streams that are separately encoded, the data of a following chapter is transmitted to the VBV buffer without consideration of the occupied amount of a preceding chapter of the VBV buffer. Subsequently, an error may occur in the VBV buffer.

Accordingly, the present invention provides a video-encoding device for achieving seamless connection between chapters without causing an error in the VBV buffer.

DISCLOSURE OF INVENTION

For solving the above-described problems, a video-encoding device of the present invention (1) is a video-encoding device for encoding video signals and exerts control over the encoding according to an occupied amount of a virtual buffer, the occupied amount being determined based on the amount of codes generated through the encoding and the amount of codes transferred to an output destination. The video-encoding device comprises recording-mode determination means for determining whether or not seamless connection between a preceding chapter and the following chapter that are included in the video signals is feasible and setting an initial value of the occupied amount of the virtual buffer based on the determination result, occupied-amount update means for updating the occupied amount of the virtual buffer every time the encoding is performed, optimum-occupied-amount calculation means for calculating a predetermined optimum occupied amount based on the updated occupied amount of the virtual buffer, target-code-amount calculation means for calculating a predetermined target-code amount based on the video signals of the following chapter, target-code-amount adjustment means for adjusting the target code amount so that the sum total of the occupied amount of the virtual buffer and the target code amount does not exceed the optimum occupied amount, and encoding means for performing the encoding based on the adjusted target code amount. Accordingly, the initial value of the occupied amount of the virtual buffer is set, the target code amount is calculated based on the occupied amount, and the encoding is performed. Therefore, the seamless connection between chapters can be achieved without causing an error in the virtual buffer.

Further, in a video-encoding device of the present invention (2), the video-encoding device being provided according to the video-encoding device of the present invention (1), the recording-mode determination means determines an occupied amount of the virtual buffer immediately before the video signals of the following chapter are transferred to the virtual buffer to be an initial value of the occupied amount of the virtual buffer, where the seamless connection is feasible, and sets the initial value of the occupied amount of the virtual buffer to zero, where the seamless connection is infeasible. Subsequently, where the initial value of the occupied amount of the virtual buffer for the following chapter is set, the state of the occupied amount due to the preceding chapter of the virtual buffer is taken over.

Further, in a video-encoding device of the present invention (3), the video-encoding device being provided according to the video-encoding device of the present invention (2), the occupied-amount update means determines a predetermined value that is obtained by subtracting the code-for-transfer amount from the occupied amount and adding the generated-code amount to the occupied amount and that is not larger than the maximum value of the virtual buffer to be a new occupied amount, where the occupied amount is larger than the code-for-transfer amount, and determines the generated-code amount to be the new occupied amount, where the occupied amount is equivalent to the code-for-transfer amount or less. Accordingly, information about the occupied amount of the virtual buffer is updated.

Further, in a video-encoding device of the present invention (4), the video-encoding device being provided according to the video-encoding device of the present invention (2), the optimum-occupied-amount calculation means calculates a predetermined value that is equivalent to and/or as large as the updated occupied amount of the virtual buffer, as the optimum occupied amount. Subsequently, the occupied amount of the virtual buffer can be reflected in the bit rate, so that steep image deterioration can be reduced.

Further, a video-encoding control device of the present invention (5) is a video-encoding control device for exerting control over encoding based on an occupied amount of a virtual buffer, the occupied amount being determined based on the amount of codes generated at the time where video signals are encoded and the amount of codes transferred to an output destination. The video-encoding control device comprises recording-mode determination means for determining whether or not seamless connection between a preceding chapter and the following chapter that are included in the video signals is feasible and setting an initial value of the occupied amount of the virtual buffer based on the determination result, occupied-amount update means for updating the occupied amount of the virtual buffer every time the encoding is performed, optimum-occupied-amount calculation means for calculating a predetermined optimum occupied amount based on the updated occupied amount of the virtual buffer, target-code-amount calculation means for calculating a predetermined target-code amount based on the video signals of the following chapter, and target-code-amount adjustment means for adjusting the target code amount so that the sum total of the occupied amount of the virtual buffer and the target code amount does not exceed the optimum occupied amount and using the adjusted target code amount for the encoding. Accordingly, the initial value of the occupied amount of the virtual buffer is set and the target code amount is calculated based on the occupied amount, so that the encoding is controlled. Therefore, the seamless connection between chapters can be achieved without causing an error in the virtual buffer.

Further, in a video-encoding control device of the present invention (6), the video-encoding control device being provided according to the video-encoding control device according to the present invention (2), the recording-mode determination means determines an occupied amount of the virtual buffer immediately before the video signals of the following chapter are transferred to the virtual buffer to be an initial value of the occupied amount of the virtual buffer, where the seamless connection is feasible, and sets the initial value of the occupied amount of the virtual buffer to zero, where the seamless connection is infeasible. Subsequently, where the initial value of the occupied amount of the virtual buffer for the following chapter is set, the state of the occupied amount due to the preceding chapter of the virtual buffer is taken over.

Further, a video-encoding control method of the present invention (7) is a video-encoding control method for exerting control over encoding based on an occupied amount of a virtual buffer, the occupied amount being determined based on the amount of codes generated at the time where video signals are encoded and the amount of codes transferred to an output destination. The video-encoding control method comprises a step for determining whether or not seamless connection between a preceding chapter and the following chapter that are included in the video signals is feasible, a step for setting an initial value of the occupied amount of the virtual buffer based on the determination result, a step for updating the occupied amount of the virtual buffer every time the encoding is performed, a step for calculating a predetermined optimum occupied amount based on the updated occupied amount of the virtual buffer, a step for calculating a predetermined target-code amount based on the video signals of the following chapter, and a step for adjusting the target code amount so that the sum total of the occupied amount of the virtual buffer and the target code amount does not exceed the optimum occupied amount and using the adjusted target code amount for the encoding. Accordingly, the initial value of the occupied amount of the virtual buffer is set and the target code amount is calculated based on the occupied amount, so that the encoding is controlled. Therefore, the seamless connection between chapters can be achieved without causing an error in the virtual buffer.

A video-encoding control method of the present invention (8) is a video-encoding control method for exerting control over encoding based on an occupied amount of a virtual buffer, the occupied amount being determined based on the amount of codes generated at the time where video signals are encoded and the amount of codes transferred to an output destination. The video-encoding control method comprises a step for determining whether or not seamless connection between a preceding chapter and the following chapter that are included in the video signals is feasible, a step for determining an occupied amount of the virtual buffer immediately before the video signals of the following chapter are transferred to the virtual buffer to be an initial value of the occupied amount of the virtual buffer, where it is determined that the seamless connection is feasible based on the determination result, and setting the initial value of the occupied amount of the virtual buffer to zero, where it is determined that the seamless connection is infeasible, a step for updating the occupied amount of the virtual buffer every time the encoding is performed, a step for calculating a predetermined optimum occupied amount based on the updated occupied amount of the virtual buffer, a step for calculating a predetermined target-code amount based on the video signals of the following chapter, and a step for adjusting the target code amount so that the sum total of the occupied amount of the virtual buffer and the target code amount does not exceed the optimum occupied amount and using the adjusted target code amount for the encoding. Subsequently, where the initial value of the occupied amount of the virtual buffer for the following chapter is set, the state of the occupied amount due to the preceding chapter of the virtual buffer is taken over.

Further, a program of the present invention (9) is a program for exerting control over encoding based on an occupied amount of a virtual buffer, the occupied amount being determined based on the amount of codes generated at the time where video signals are encoded and the amount of codes transferred to an output destination. The program makes a computer execute a step for determining whether or not seamless connection between a preceding chapter and the following chapter that are included in the video signals is feasible, a step for determining an initial value of the occupied amount of the virtual buffer based on the determination result, a step for updating the occupied amount of the virtual buffer every time the encoding is performed, a step for calculating a predetermined optimum occupied amount based on the updated occupied amount of the virtual buffer, a step for calculating a predetermined target-code amount based on the video signals of the following chapter, and a step for adjusting the target code amount so that the sum total of the occupied amount of the virtual buffer and the target code amount does not exceed the optimum occupied amount and using the adjusted target code amount for the encoding. Accordingly, the initial value of the occupied amount of the virtual buffer is set and the target code amount is calculated based on the occupied amount, so that the encoding is controlled. Therefore, the seamless connection between chapters can be achieved without causing an error in the virtual buffer.

A program of the present invention (10) is a program for exerting control over encoding based on an occupied amount of a virtual buffer, the occupied amount being determined based on the amount of codes generated at the time where video signals are encoded and the amount of codes transferred to an output destination. The program makes a computer execute a step for determining whether or not seamless connection between a preceding chapter and the following chapter that are included in the video signals is feasible, a step for determining an occupied amount of the virtual buffer immediately before the video signals of the following chapter are transferred to the virtual buffer to be an initial value of the occupied amount of the virtual buffer, where it is determined that the seamless connection is feasible based on the determination result, and setting the initial value of the occupied amount of the virtual buffer to zero, where it is determined that the seamless connection is infeasible, a step for updating the occupied amount of the virtual buffer every time the encoding is performed, a step for calculating a predetermined optimum occupied amount based on the updated occupied amount of the virtual buffer, a step for calculating a predetermined target-code amount based on the video signals of the following chapter, and a step for adjusting the target code amount so that the sum total of the occupied amount of the virtual buffer and the target code amount does not exceed the optimum occupied amount and using the adjusted target code amount for the encoding. Subsequently, where the initial value of the occupied amount of the virtual buffer for the following chapter is set, the state of the occupied amount due to the preceding chapter of the virtual buffer is taken over.

The present invention has a good effect of achieving seamless connection between chapters without causing an error in a VBV buffer.

BEST MODE FOR CARRYING OUT THE INVENTION

Next, an embodiment of the present invention will be described in detail with reference to drawings.

Figure 1:
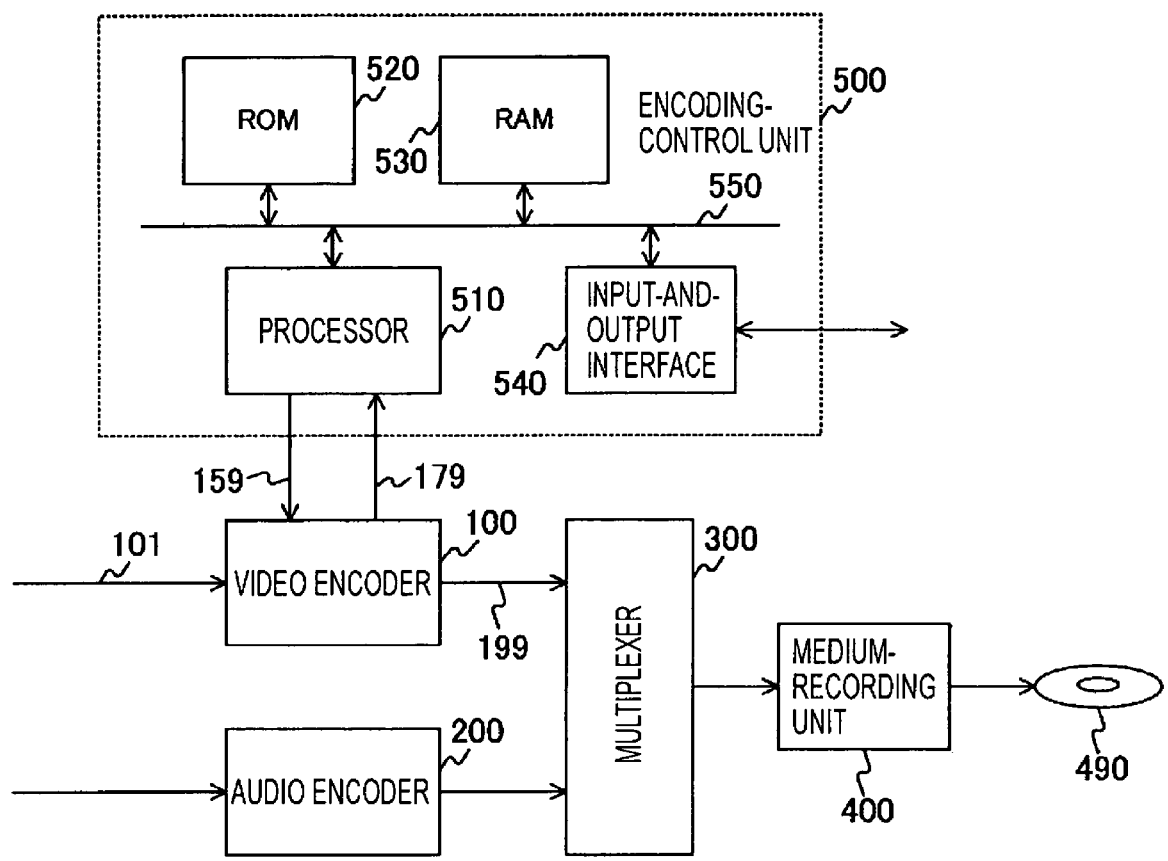
FIG. 1 shows an example configuration of a video-encoding device according to an embodiment of the present invention.

FIG. 1 shows an example configuration of a video-encoding device according to an embodiment of the present invention. The video-encoding device includes a video encoder 100 for encoding a video signal, an audio encoder 200 for encoding an audio signal, a multiplexer 300 for multiplexing outputs of the video encoder 100 and the audio encoder 200, a medium-recording unit 400 for recording stream data multiplexed by the multiplexer 300 onto a recording medium 490, and an encoding-control unit 500 for controlling encoding performed by the video encoder 100.

The encoding-control unit 500 includes a processor 510, a ROM 520, a RAM 530, an input-and-output interface 540, and a bus 550 for connecting the above-described units to one another. The processor 510 receives a generated-code amount or the amount of data encoded by the video encoder 100 via a signal line 179, determines a quantization index conforming to a target-code amount or the amount of target data for encoding the next picture, and externally transmits the quantization index through a signal line 159. The ROM 520 is a memory for holding programs, various parameters, and so forth that are executed by the processor 510 and achieved by an EPROM including a flush memory or the like, for example. The RAM is a memory for holding work data or the like, where the work data is necessary when the processor 510 executes the program, and achieved by an SRAM, a DRAM, etc., for example. The input-and-output interface 540 exchanges data between itself and the outside, and is used for updating the program in the ROM 520, for example.

Figure 2:
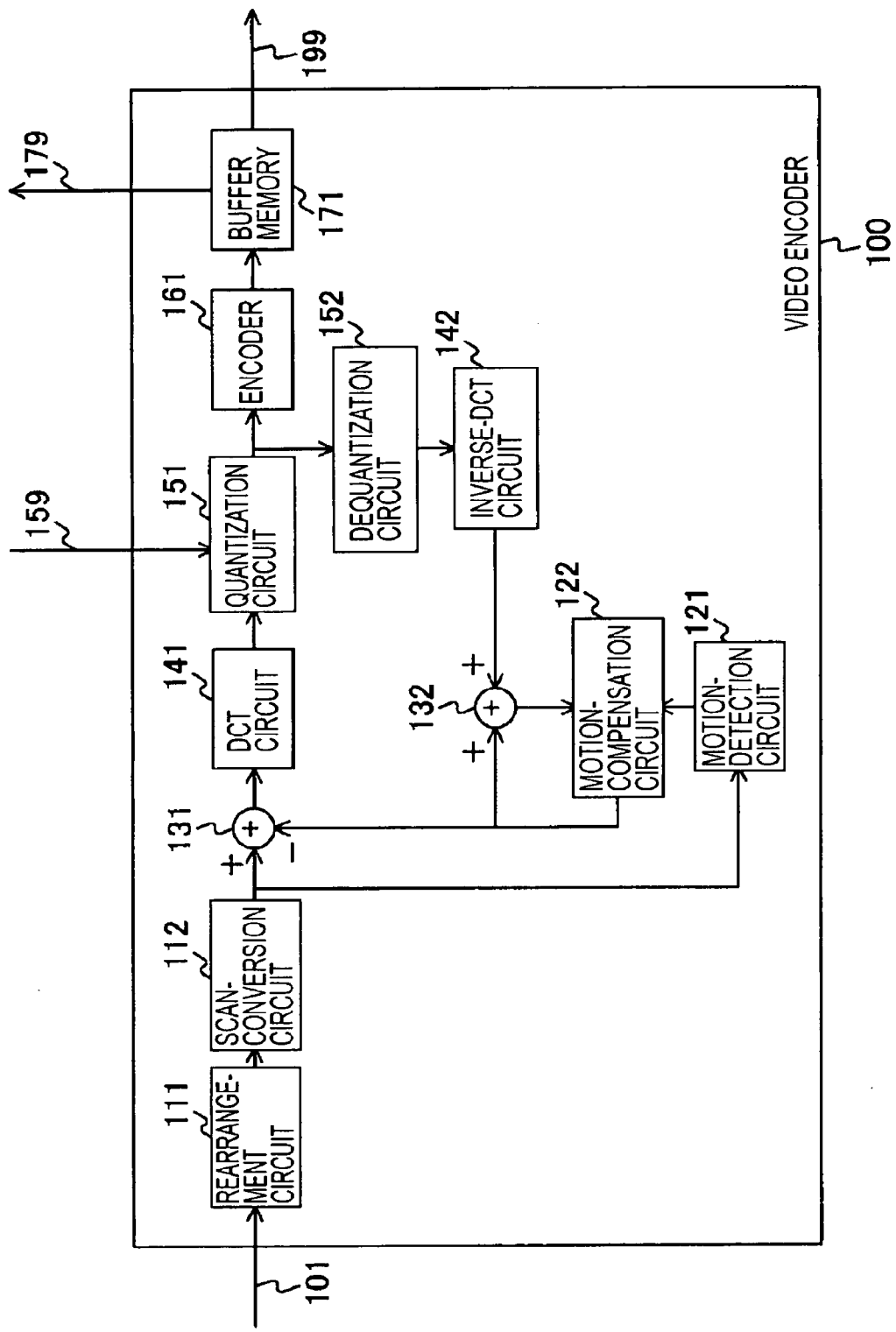
FIG. 2 shows an example configuration of a video encoder 100 according to the embodiment of the present invention.

FIG. 2 shows an example configuration of the video encoder 100 according to the embodiment of the present invention. This video encoder 100 encodes a video signal transmitted thereto via a signal line 101 and externally transmits the encoded video signal via a signal line 199. The video encoder 100 includes a rearrangement circuit 111, a scan-conversion circuit 112, a motion-detection circuit 121, a motion-compensation circuit 122, a subtractor 131, an adder 132, a DCT circuit 141, an inverse-DCT circuit 142, a quantization circuit 151, a dequantization circuit 152, an encoder 161, and a buffer memory 171.

The rearrangement circuit 111 rearranges each of pictures of video signals transmitted thereto via the signal line 101 according to the encoding order and transmits the rearranged pictures to the scan-conversion circuit 112. The scan-conversion circuit 112 determines whether the data of the transmitted pictures has a frame structure or a field structure and performs scan conversion compliant with the determination result for the data of the transmitted pictures. Then, the scan-conversion circuit 112 converts the data into macro-block data and externally transmits the macro-block data to each of the motion-detection circuit 121 and the subtractor 131.

The motion-detection circuit 121 detects a motion vector based on the data transmitted from the scan-conversion circuit 112 and transmits the motion vector to the motion-compensation circuit 122. The motion-compensation circuit 122 reads image data conforming to the macro-block data transmitted to the subtractor 131 of image data that was stored in the motion-compensation circuit 122 in advance based on the motion vector transmitted from the motion-detection circuit 121. Then, the motion-compensation circuit 122 transmits the read image data to each of the subtractor 131 and the adder 132, as predicted-image data.

Where the macro-block data transmitted from the scan-conversion circuit 112 is an I picture, the subtractor 131 transmits the macro-block data in its original format to the DCT circuit 141. Where the macro-block data is a P picture, or a B picture, the subtractor 131 transmits data obtained by subtracting the predicted-image data transmitted from the motion-compensation circuit 122 from the macro-block data to the DCT circuit 141.

The DCT circuit 141 performs DCT (Discrete Consign Transform) processing for the data transmitted from the subtractor 131 and converts the data into a DCT coefficient. The quantization circuit 151 quantizes the DCT coefficient transmitted from the DCT circuit 141 based on the quantization index transmitted from the encoding-control unit 500 via the signal line 159 and transmits the quantized DCT coefficient to the encoder 161 and the dequantization circuit 152. The encoder 161 converts the quantized data into a variable-length code and stores the variable-length code in the buffer memory 171. The buffer memory 171 converts the stored variable-length code into data in pictures and externally transmits the data to the signal line 199, as bit-stream data. Further, the buffer memory 171 transmits the amount of generated variable-length codes of an entire picture to the encoding-control unit 500 via the signal line 179, as a generated-code amount.

The dequantization circuit 152 dequantizes the quantized data transmitted from the quantization circuit 151. The inverse DCT circuit 142 performs inverse DCT processing for the data dequantized by the dequantization circuit 152 and transmits the data to the adder 132. The adder 132 adds the data transmitted from the inverse DCT circuit 142 to the predicted-image data transmitted from the motion-compensation circuit 122 so that the original image is reconstructed, and transmits the original image data to the motion-compensation circuit 122, so as to generate predicted-image data corresponding to the macro-block image data that will be encoded next time or later.

Figure 3A:
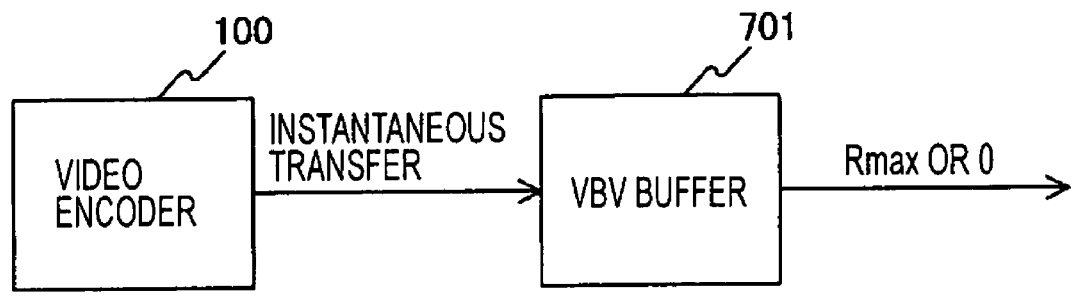
FIGS. 3A and 3B show models of VBV buffers compliant with the MPEG-2 standard.
Figure 3B:
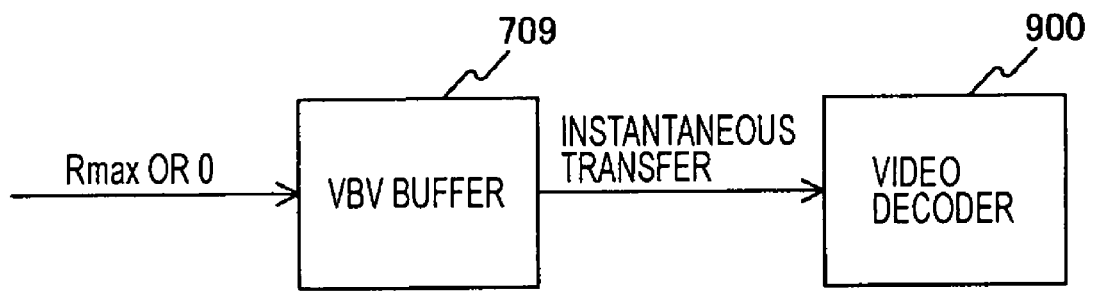

FIGS. 3A and 3B show models of VBV buffers under the MPEG-2 standard. Under the MPEG-2 standard, virtual buffers referred to as VBV buffers are envisioned between the encoder and a decoder for transmitting and decoding obtained bit-stream data in an appropriate manner, and encoding is performed so that the VBV buffers do not overflow. The difference between the amount of codes generated by the encoder and the amount of codes transferred to an output destination corresponds to the amount of data (This amount is referred to as an "occupied amount".) existing in the VBV buffers. The maximum amount of the VBV buffers is defined as 224 KB. However, the VBV buffers are provided virtually and do not necessarily exist.

When the VBV buffers are viewed from the encoder-side, a VBV buffer 701 is connected to the output-side of the video encoder 100 and data is instantaneously transferred from the video encoder 100 to the VBV buffer 701 in theory, as shown in FIG. 3A. Then, where data exists in the VBV buffer 701, an output signal from the VBV buffer 701 is transferred at transfer speed Rmax. Where no data exists in the VBV buffer 701, the output signal from the VBV buffer 701 is transferred at transfer speed 0. Subsequently, the occupied amount of the VBV buffer 701 is obtained and operations of the video encoder 100 are controlled so that the occupied amount does not exceed the maximum amount of the VBV buffer 701 (so that the VBV buffer 701 does not overflow).

On the other hand, when the VBV buffers are viewed from the decoder side, a VBV buffer 709 is connected to the input side of a video decoder 900 and data is instantaneously transferred from the VBV buffer 709 to the video decoder 900 in theory, as shown in FIG. 3B. Then, an input signal to the VBV buffer 709 is transferred at the transfer speed Rmax, or the transfer speed 0. In that case, the transfer is performed so that an occupied amount of the VBV buffer 709 does not exceed the maximum amount thereof and the input signal must be transferred, so as to be in time for decoding performed by the video decoder 900. If the input signal is late for the decode-timing of the video decoder 900, underflow occurs in the VBV buffer 709.

Figure 4:
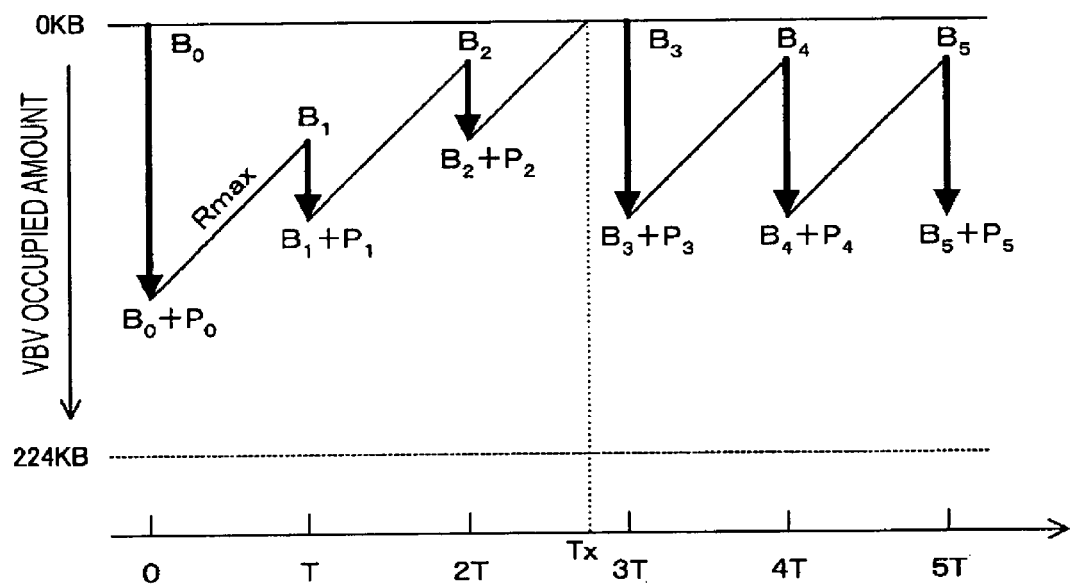
FIG. 4 shows an example transition of the occupied amount of a VBV buffer 701 on the encoder side.

FIG. 4 shows an example transition of the occupied amount of the VBV buffer 701 on the encoder side. The vertical axis represents the occupied amount of the VBV buffer and the lateral axis represents time, respectively. The occupied amount along the vertical axis is shown in a downward direction, which means that the occupied amount increases as it falls. Incidentally, the maximum amount of the VBV buffer 701 is defined as 224 KB.

Incidentally, here, the sign T represents the picture-generation cycle, that is, the reciprocal of the frame rate. Further, the sign n is an integer representing the number of a desired picture. Further, the sign PX represents the actual amount of generated codes of the X-th picture and the sign BX represents the occupied amount of the VBV buffer immediately before the X-th picture is encoded.

The video encoder 100 encodes video signals transmitted thereto in order of the picture number. Immediately after the 0-th picture is encoded (time 0), generated-code amount P0 is instantaneously transferred to the VBV buffer 701, and the occupied amount of the VBV buffer is represented by B0+P0. Subsequently, until the time when encoding of the next or first picture is finished, codes are transmitted from the VBV buffer 701 at the transfer speed Rmax, whereby the occupied amount of the VBV buffer 701 decreases over the course of time.

Just prior to the time when the first picture is encoded (time T), the occupied amount of the VBV buffer 701 becomes B1 and the first picture with generated-code amount P1 is instantaneously transferred to the VBV buffer 701. As a result, at the time T, the occupied amount of the VBV buffer 701 is represented by B1+P1.

After that, data is further transferred from the VBV buffer 701 and the codes of encoded pictures are further stored in the VBV buffer 701 in the above-described manner. Just prior to the time when the n-th picture is encoded (time n×T), the occupied amount of the VBV buffer is represented by the sign Bn (=Bn−1+Pn−1) and the n-th picture with code amount Pn is instantaneously transferred to the VBV buffer. As a result, at the time n×T, the occupied amount of the VBV buffer 701 is represented by Bn+Pn.

Here, when the amount of externally transmitted codes exceeds the amount of internally transmitted codes, the occupied amount of the VBV buffer 701 becomes 0, as indicated at time Tx, and the VBV buffer 701 stops transmitting data. When the data is stored in a DVD, the occurrence of underflow of the VBV buffer 701 on the encoder side is tolerable. However, even though the data is stored in the DVD, overflow of the VBV buffer 701 is not tolerable. Therefore, the video encoder 100 must have control over the VBV buffer 701 so that the VBV buffer 701 does not overflow.

Figure 5A:
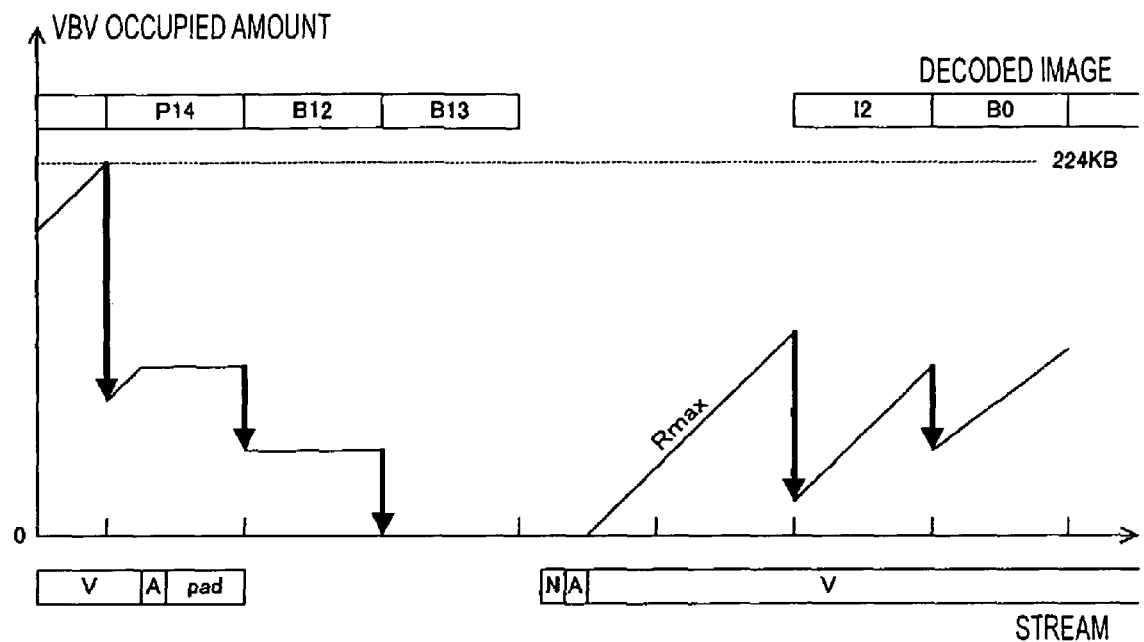
FIGS. 5A and 5B show example transitions of the occupied amount of a VBV buffer 709 on the decoder side.
Figure 5B:
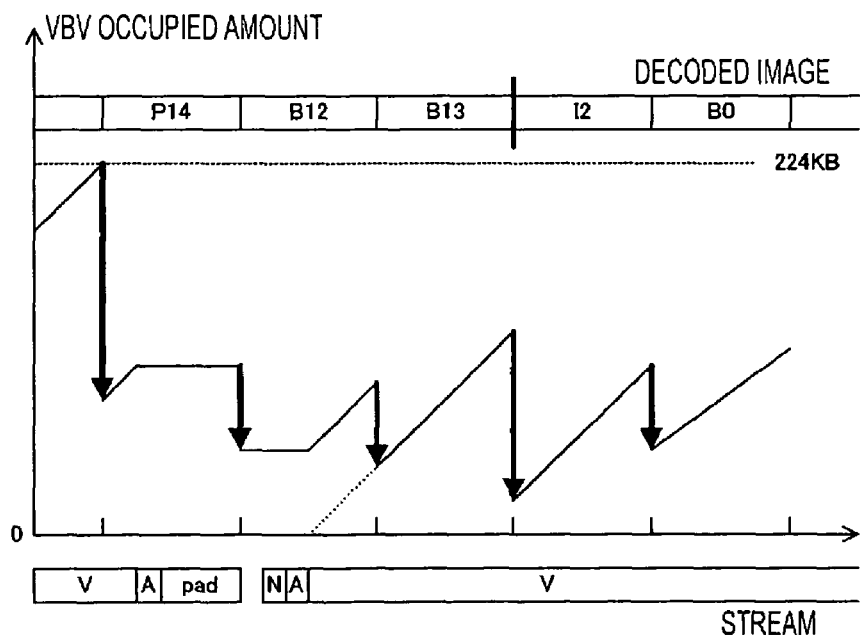

FIGS. 5A and 5B show example transitions of the occupied amount of the VBV buffer 709 on the decoder side. The vertical axis represents the occupied amount of the VBV buffer and the lateral axis represents time, respectively. In contrast to FIG. 4, the occupied amount along the vertical axis is shown in an upward direction, which means that the occupied amount increases as it rises.

Where a video stream exists in a bit stream, a code is stored in the VBV buffer 709 at the transfer speed Rmax. Where no video stream exists in the bit stream, no codes are stored in the VBV buffer 709. Further, the code instantaneously flows from the VBV buffer 709 to the video decoder 900 at the time when decoding of each of the pictures is started.

Where chapters are not seamlessly connected to each other, as shown in FIG. 5A, a decoded image has a gap corresponding to an interval between a preceding chapter and the following chapter. In that case, after the occupied amount of the VBV buffer 709 due to the generated codes of the preceding chapter becomes zero, codes generated by the following chapter flow in. Therefore, there is no need to make allowance for interference of chapters, where the interference is caused by the VBV buffer 709.

However, where the chapters are seamlessly connected to each other, as shown in FIG. 5B, generated codes of the following chapter flow in before the occupied amount of the VBV buffer 709 due to the preceding chapter becomes zero. Therefore, the occupied amount of the VBV buffer 709 due to the preceding chapter should be taken over for calculating the initial value of the VBV buffer 709. If the generated codes of the following chapter start flowing in at the time where much of the occupied amount of the VBV buffer 709 due to the preceding chapter remains, the VBV buffer 709 may overflow.

On the other hand, if a code-inflow for decoding is started at the time when the amount of code data stored in the VBV buffer 709 is insufficient, the VBV buffer 709 may underflow. For example, where a necessary amount of code data for decoding a first picture (I2) of the following chapter is drawn instantaneously and if the amount of code data stored in the VBV buffer 709 is insufficient, the code data necessary for the decoding cannot be obtained. Therefore, the seamless connection cannot be achieved. For storing the sufficient amount of code data in advance, transfer of a bit stream of the following chapter should be started as soon as possible. However, there is a limit to how soon the transfer of the following chapter can be started, since the transfer of the following chapter has to be started after transfer of the preceding chapter is finished.

Therefore, according to the embodiment of the present invention, encoding is performed while restrictions are put on the amount of generated code data of the following chapter, as below, so as to allow seamless connection between chapters even though requirements for the VBV buffers are met. Further, since there is a close connection between the above-described VBV buffers 701 and 709, the VBV buffer 701 will be described, as a premise.

Figure 6:
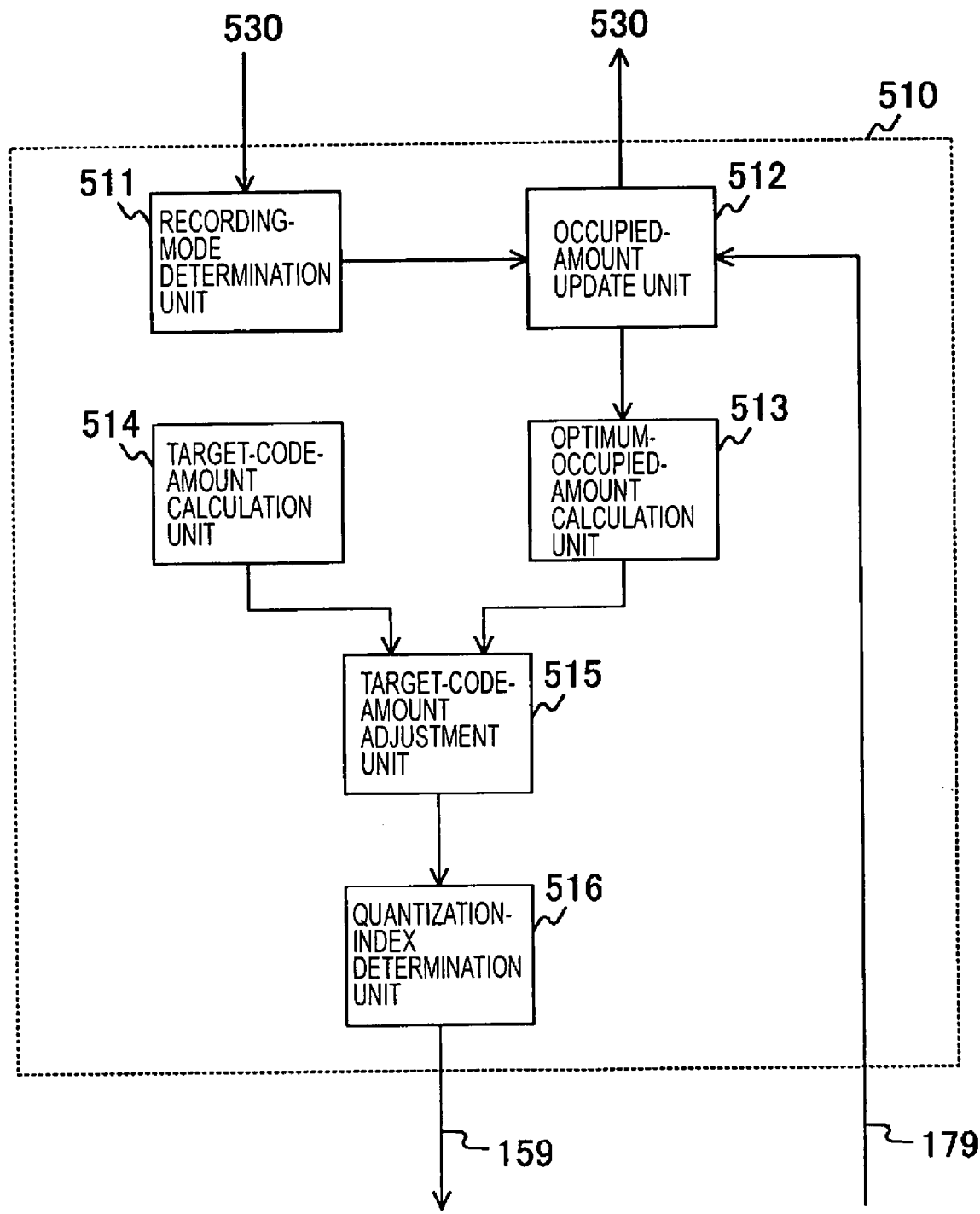
FIG. 6 shows an example functional configuration of a processor 510 of an encoding-control unit 500 according to the embodiment of the present invention.

FIG. 6 illustrates an example functional configuration of a processor 510 of the encoding-control unit 500 according to the embodiment of the present invention. In this example functional configuration, a recording-mode determination unit 511, an occupied-amount update unit 512, an optimum occupied-amount calculation unit 513, a target-code-amount calculation unit 514, a target-code-amount adjustment unit 515, and a quantization-index determination unit 516 are provided. Further, even though this example is given on the assumption that the processor 510 achieves each of functions according to a program held in the ROM 520, those functions may be achieved through hardware.

The recording-mode determination unit 511 determines whether or not the seamless connection between the chapters can be achieved. For achieving the seamless connection, the following chapter subjected to the seamless connection should not be the first chapter of a title to which the following chapter belongs, a time period of reproducing the final VOB of the preceding chapter should not be less than 1.5 sec, and a seek time period determined due to the on-medium layout should fall within an allowable range, for example. The presence or absence of the seamless connection determined by the recording-mode determination unit 511 affects a seamless playback flag in a C_PBIT (Cell PlayBack Information Table) of PGCI (ProGram Chain Information) of VTSI (Video Title Set Information) in a data-storage area of the DVD. That is to say, where the seamless connection is performed, the seamless playback flag of the following chapter is set to ON and where the seamless connection is not performed, the seamless playback flag of the following chapter is set to OFF.

Further, where it is determined that the seamless connection is feasible, the recording-mode determination unit 511 determines the immediately preceding occupied amount of the VBV buffer held in the RAM 530 (or the ROM 520) to be the initial value of the VBV buffer. On the other hand, where it is determined that the seamless connection is not feasible, the initial value of the VBV buffer is set to zero. The initial value of the VBV buffer corresponds to an occupied amount "B0" shown in FIG. 4. The initial value of the VBV buffer is set in the above-described manner and transmitted to the occupied-amount update unit 512.

The occupied-amount update unit 512 updates the occupied amount of the VBV buffer based on the amount of generated code data transmitted from the buffer memory 171 of the video encoder 100. For example, where "B0+P0" shown in FIG. 4 is determined to be the immediately previous timing, the amount of code data for transfer up to "B1" is subtracted from "B0+P0". Further, the amount of generated code data "P1" is added to "B0+P0".

In that case, if the assumption is made that the transfer speed Rmax is 9.3 Mbps and the NTSC (National Television Standards Committee) method is determined to be a screen method, the frame frequency of the NTSC is represented, as:

$$(1000/1001 \times 30) 29.97 \text{ Hz},$$

whereby the amount of code data transferred per cycle is represented, as:

$$9.3 \text{ Mbps}/29.97 \text{ Hz} = 310.31 \text{ K bits}.$$

Where the amount of code data for transfer is subtracted and the VBV buffer is emptied, as indicated at Tx shown in FIG. 4, the occupied amount at that point becomes zero, since further data transfer is infeasible. Then, a value obtained by adding the generated-code-data amount to the occupied amount becomes a new occupied amount. The occupied amount updated in the above-described manner is held in the RAM 530 (or the ROM 520) and transmitted to the optimum-occupied-amount calculation unit 513.

The optimum-occupied-amount calculation unit 513 calculates the optimum occupied amount of the VBV buffer at the time when the next picture is encoded. The optimum occupied amount is an index of an ideal occupied amount of the VBV buffer after the next-picture encoding is finished. If the occupied amount of the VBV buffer exceeds the value, the possibility that the VBV buffer overflows significantly increases. It was shown by experiment data that the optimum occupied amount can be calculated by a function shown as: By=VBV (Bx). By using the function VBV, the occupied amount of the VBV buffer can be quickly reflected in the bit rate, so that steep image deterioration can be reduced. Here, the sign Bx represents the amount of using VBV buffer before the x-th picture is encoded and the sign By represents the optimum occupied amount of the VBV buffer after the x-th picture is encoded.

Characteristic 1: By=VBV (Bx) represents a monotonously increasing function for Bx in Bx section [0, Bmax].

Characteristic 2: function {By=Bx} and function {By=VBV (Bx)−(Rmax×T)} cross each other at Bx=Bth (where 0<Bth<Bmax) in the Bx section [0, Bmax].

Characteristic 3: Where an expression Bx≦Bth holds, an expression {VBV(Bx)−(Rmax×T)}≧Bx holds, and where an expression Bx>Bth holds, an expression {VBV(Bx)−(Rmax×T)}<Bx holds.

Figure 7:
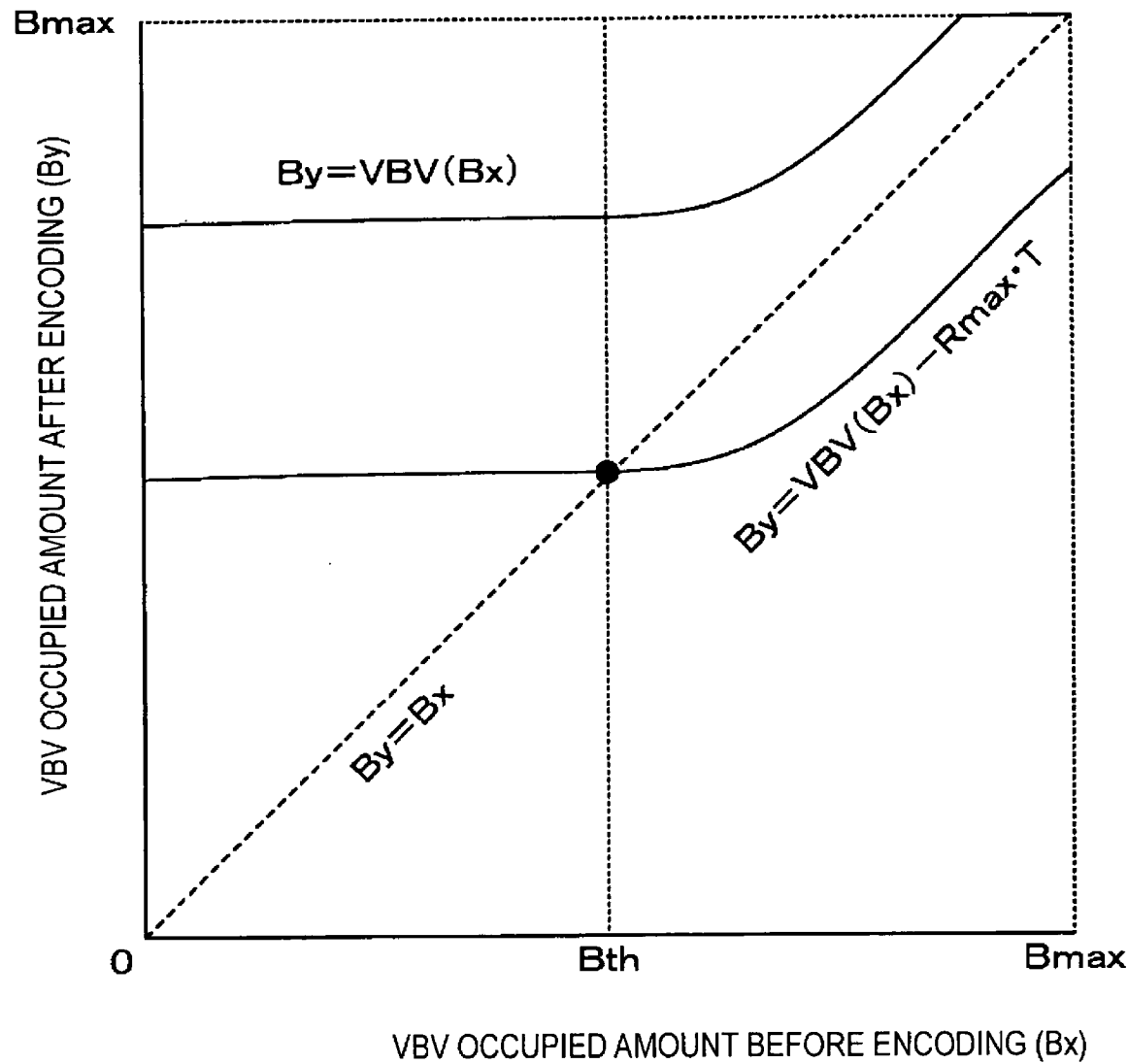
FIG. 7 shows an example function VBV of the present invention.

FIG. 7 shows an example VBV function having the above-described three characteristics. In the case of the VBV function, the value By remains constant at a predetermined value (a value of Bth or more) in a section where the value BX is [0, Bth]. Further, the value By gradually increases at the increase rate of less than one in a section where the value BX is [Bth, Bmax].

In FIG. 6, the optimum-occupied-amount calculation unit 513 transmits the optimum occupied amount obtained in the above-described manner of the VBV buffer to the target-code-amount adjustment unit 515.

The target-code-amount calculation unit 514 calculates a target-code amount based on a video signal of the following chapter that will be subjected to the seamless connection. Various types of models have been proposed for calculating the target code amount. Here, the known TM5 method is used, as an example. The TM5 method has been proposed, as a model for controlling the code amount of the MPEG-2 (refer to ISO/IEC JTC1/SC29/WG11, MPEG93/457, "Test Model 5," 1993.), so as to determine allocation of the code-data amount according to each of picture types.

The target-code-amount adjustment unit 515 determines whether or not the value obtained by adding the target code amount to the current occupied amount exceeds the optimum occupied amount with reference to the target code amount calculated by the target-code-amount calculation unit 514 and the optimum occupied amount calculated by the optimum-occupied-amount calculation unit 513. If the value exceeds the optimum occupied amount, the target-code-amount adjustment unit 515 adjusts the target-code amount so that a value obtained by subtracting the current occupied amount from the optimum occupied amount becomes the target-code amount. The target-code amount adjusted in the above-described manner is transmitted to the quantization-index determination unit 516.

The quantization-index determination unit 516 determines a quantization index corresponding to a quantization characteristic value of the quantization circuit 151, so that the generated-code amount of the video encoder 100 becomes the target-code amount transmitted from the target-code-amount adjustment unit 515. The quantization index is transmitted to the quantization circuit 151 via the signal line 159.

Next, operations of the video-encoding device according to the embodiment of the present invention will be described with reference to the attached drawings.

Figure 8:
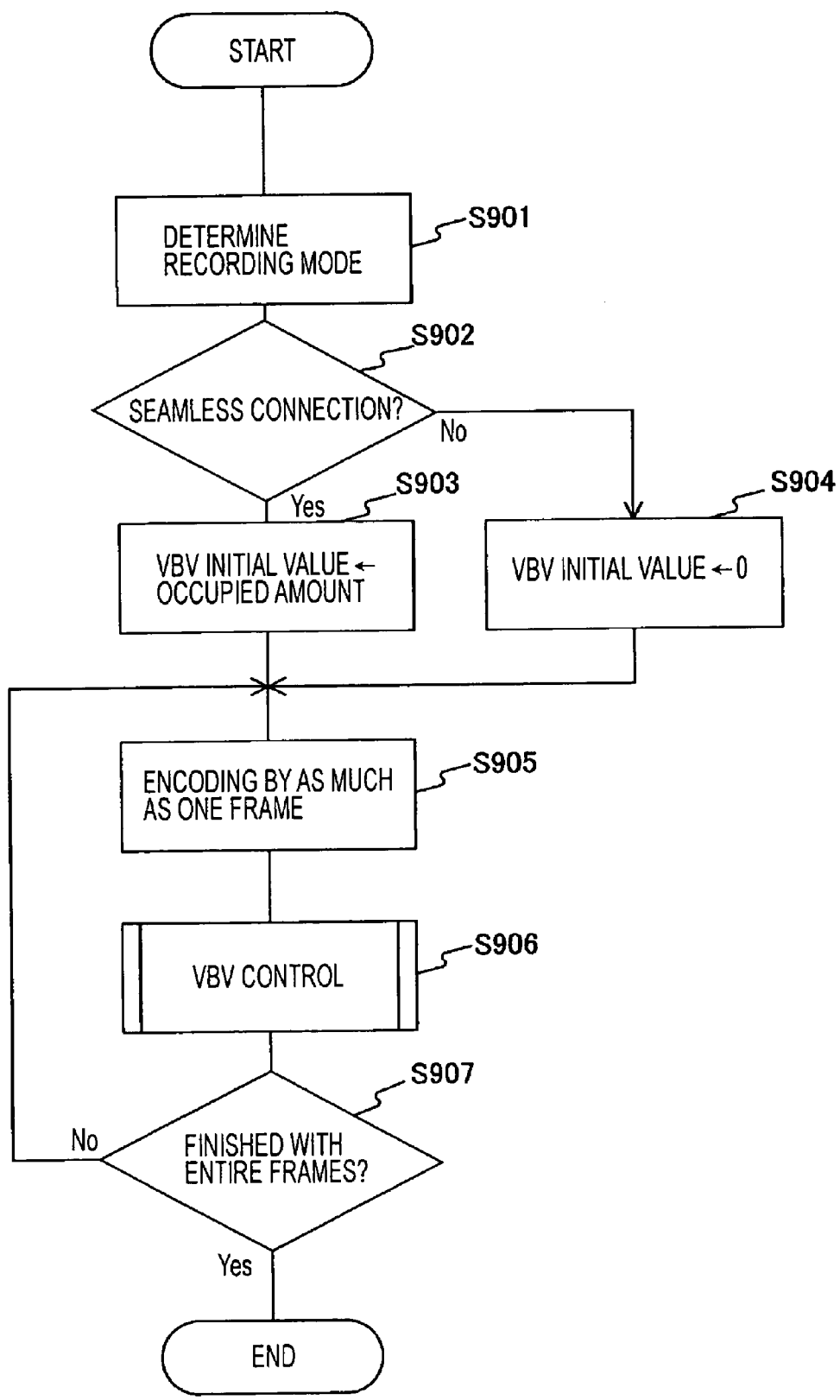
FIG. 8 is a flowchart illustrating example processing performed by the video-encoding device according to the embodiment of the present invention.

FIG. 8 is a flowchart illustrating example processing performed by the video-encoding device according to the embodiment of the present invention. Prior to encoding the following chapter, the recording-mode determination unit 511 determines whether or not seamless connection should be performed, as a recording mode (step S901). Where the seamless connection is performed (step S902), the immediately previous occupied amount of the VBV buffer held in the RAM 530 (or the ROM 520) is set, as the initial value of the VBV buffer (step S903). On the other hand, where the seamless connection is not performed (step S902), the initial value of the VBV buffer is set to zero (step S904).

After the preparations are made by the recording-mode determination unit 511, the video signals of the following chapter are encoded by as much as a single picture (frame) at a time by the video encoder 100 (step S905). Then, every time the video signals are encoded by as much as a single picture, control over the VBV buffer is effected (step S906). The above-described steps S905 and S906 are repeated until encoding for the entire pictures (frames) of the following chapter is finished (step S907).

Figure 9:
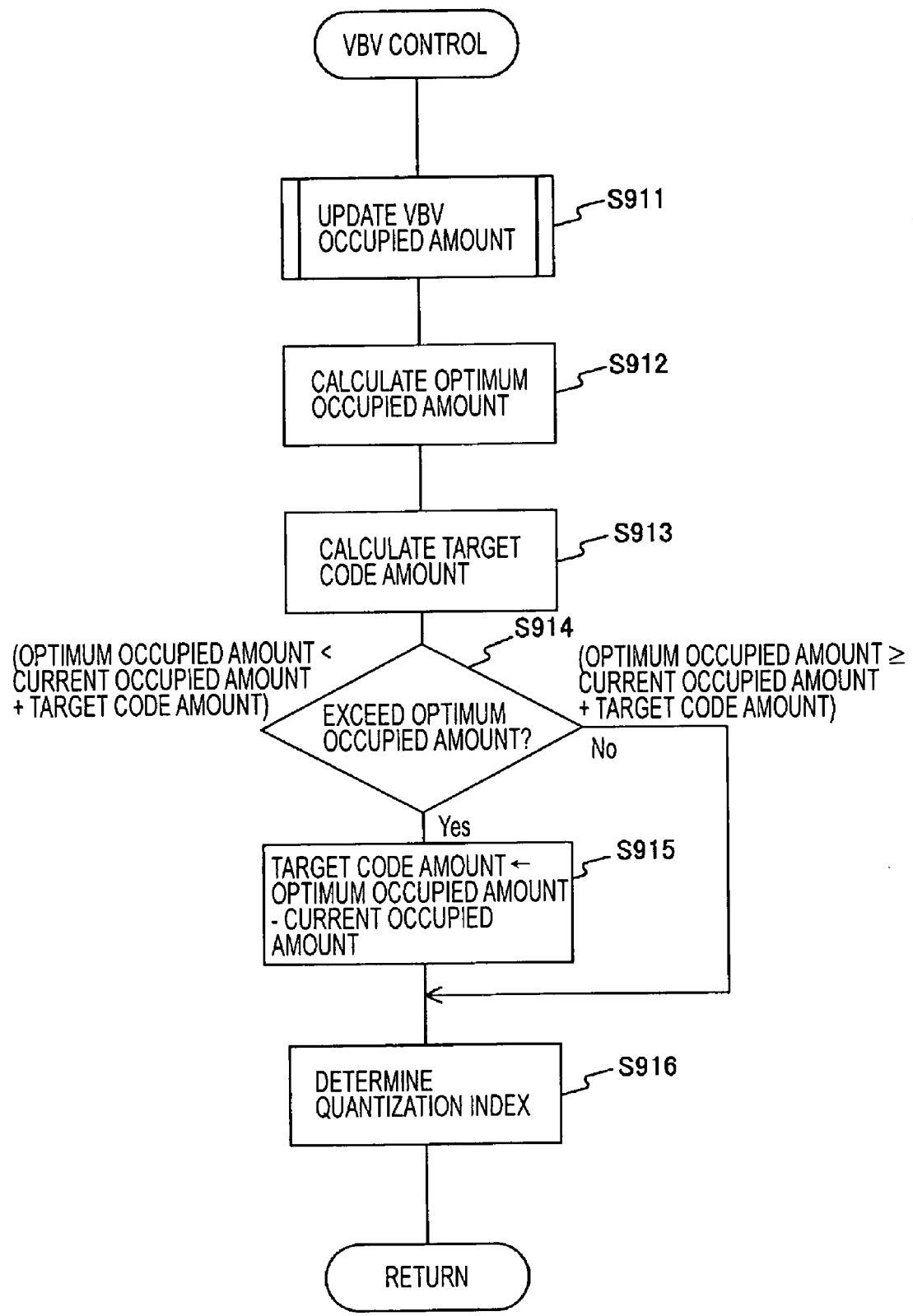
FIG. 9 is a flowchart showing example processing performed for exerting control over the VBV buffer according to the embodiment of the present invention.

FIG. 9 is a flowchart showing example processing performed for exerting control over the VBV buffer according to the embodiment of the present invention (step S906). As is clear from FIG. 8, the control over the VBV buffer is effected every time encoding is performed by as much as a single picture (frame).

When the encoding for a single picture is finished, first, information about the occupied amount of the VBV buffer is updated by the occupied-amount update unit 512 (step S911). Subsequently, the occupied amount of the VBV buffer immediately after the encoding is obtained. The details of the above-described processing will be described with reference to FIG. 10.

Then, the optimum-occupied-amount calculation unit 513 calculates the optimum occupied amount of the VBV buffer after the next encoding (step S912). The optimum occupied amount can be calculated by using the above-described VBV function, for example. Further, the target-code-amount calculation unit 514 calculates a target code amount for the next encoding (step S913). The target code amount can be calculated by using the known TM5 method, for example.

Then, the target-code-amount adjustment unit 515 determines whether or not a value obtained by adding the current occupied amount of the VBV buffer, where the current occupied amount is obtained, at step S911, to the target code amount calculated, at step S913 exceeds the optimum occupied amount calculated, at step S912 (step S914). When the value exceeds the optimum occupied amount, the target-code-amount adjustment unit 515 adjusts the value so that a value obtained by subtracting the current occupied amount from the optimum occupied amount becomes the target code amount (step S915).

The quantization-index determination unit 516 determines a quantization index based on the target code amount adjusted in the above-described manner (step S916). The quantization index is transmitted to the quantization circuit 151 of the video encoder 100.

Figure 10:
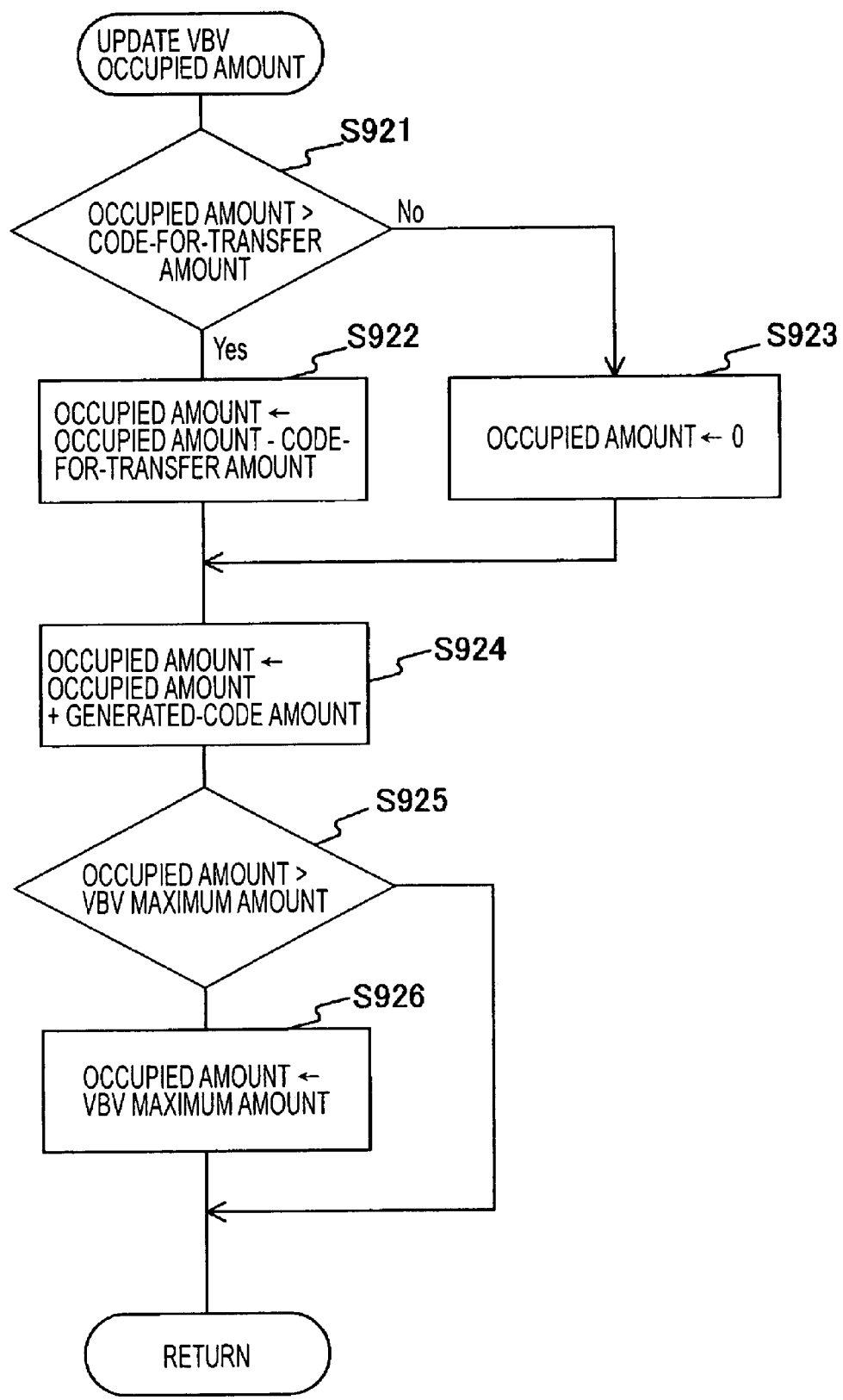
FIG. 10 is a flowchart illustrating example processing performed for updating information about the occupied amount of the VBV buffer according to the embodiment of the present invention.

FIG. 10 is a flowchart illustrating example processing performed for updating information about the occupied amount of the VBV buffer according to the embodiment of the present invention (step S911). First, a code-for-transfer amount corresponding to a single cycle is subtracted from the immediately previous occupied amount of the VBV buffer. At that time, the occupied amount before the subtraction and the code-for-transfer amount corresponding to the single cycle (310.31 K bits in the above-described example) are compared to each other (step S921). When the occupied amount before the subtraction is larger, the subtraction result becomes a new occupied amount (step S922). Otherwise, underflow occurs in the VBV buffer, so that the new occupied amount becomes zero (step S923).

Then, a generated-code amount of the video encoder 100 is added to the new occupied amount (step S924). Where the occupied amount after the addition exceeds the maximum amount of the VBV buffer (step S925), the VBV buffer overflows, whereby the new occupied amount becomes the maximum amount of the VBV buffer (step S926).

Thus, according to the embodiment of the present invention, the recording-mode determination unit 511 determines whether or not the seamless connection between chapters should be performed. The initial value of the VBV buffer is determined in advance according to the determination result, and the encoding-control unit 500 controls the generated-code amount of the following chapter subjected to the seamless connection. Subsequently, it becomes possible to achieve seamless connection that causes no errors in the VBV buffer.

Incidentally, the embodiment of the present invention is an example embodying the present invention. Although the embodiment corresponds to specific items that fall within the scope of claims of the present invention, as shown below, the present invention is not limited to the embodiment but can be modified in various ways without leaving the spirit of the present invention.

That is to say, in the present invention (1), a virtual buffer corresponds to the VBV buffer 701, for example. Further, recording-mode determination means corresponds to the recording-mode determination unit 511, for example. Further, occupied-amount update means corresponds to the occupied-amount update unit 512, for example. Further, optimum-occupied-amount calculation means corresponds to the optimum-occupied-amount calculation unit 513, for example. Further, target-code-amount calculation means corresponds to the target-code-amount calculation unit 514, for example. Further, target-code-amount adjustment means corresponds to the target-code-amount adjustment unit 515, for example. Further, encoding means corresponds to the video encoder 100, for example.

Further, in the present invention (5), a virtual buffer corresponds to the VBV buffer 701, for example. Further, recording-mode determination means corresponds to the recording-mode determination unit 511, for example. Further, occupied-amount update means corresponds to the occupied-amount update unit 512, for example. Further, optimum-occupied-amount calculation means corresponds to the optimum-occupied-amount calculation unit 513, for example. Further, target-code-amount calculation means corresponds to the target-code-amount calculation unit 514, for example.

Further, in the present invention (7), or the present invention (9), a virtual buffer corresponds to the VBV buffer 701, for example. Further, the step for determining whether or not seamless connection between a preceding chapter and the following chapter that are included in video signals is feasible corresponds to step S901, for example. Further, the step for setting the initial value of an occupied amount of the virtual buffer according to the determination result corresponds to steps S902 to S904, for example. Further, the step for updating the occupied amount of the virtual buffer every time the encoding is performed corresponds to step S911, for example. Further, the step for calculating a predetermined optimum occupied amount based on the updated occupied amount of the virtual buffer corresponds to step S912, for example. Further, the step for calculating a predetermined target code amount based on the video signals of the following chapter corresponds to step S913, for example. Further, the step for adjusting the target code amount so that the sum total of the occupied amount of the virtual buffer and the target code amount does not exceed the optimum occupied amount, and using the adjusted target code amount for encoding corresponds to steps S914 and S915, for example.

Further, in the present invention (8), or the present invention (10), a virtual buffer corresponds to the VBV buffer 701, for example. Further, the step for determining whether or not seamless connection between a preceding chapter and the following chapter that are included in video signals is feasible corresponds to step S901, for example. Further, the step for determining an occupied amount of the virtual buffer immediately before the video signals of the following chapter are transferred to the virtual buffer to be an initial value of the occupied amount of the virtual buffer, where it is determined that the seamless connection is feasible based on the determination result, and setting the initial value of the occupied amount of the virtual buffer to zero, where it is determined that the seamless connection is infeasible, corresponds to steps S902 to S904, for example. Further, the step for updating the occupied amount of the virtual buffer every time the encoding is performed corresponds to step S911, for example. Further, the step for calculating a predetermined optimum occupied amount based on the updated occupied amount of the virtual buffer corresponds to step S912, for example. Further, the step for calculating a predetermined target code amount based on the video signals of the following chapter corresponds to step S913, for example. Further, the step for adjusting the target code amount so that the sum total of the occupied amount of the virtual buffer and the target code amount does not exceed the optimum occupied amount, and using the adjusted target code amount for encoding corresponds to steps S914 and S915, for example.

Incidentally, processing steps described in the embodiment of the present invention may be interpreted, as a method including the above-described series of steps. Further, the processing steps may be interpreted, as a program for making a computer execute the above-described series of steps and/or a recording medium storing the program.

INDUSTRIAL APPLICABILITY

For example, the present invention can be used for encoding a video signal into an MPEG-2 code and writing the MPEG-2 code onto a DVD, for example.

The invention claimed is:

1. A video-encoding device for encoding video signals and exerts control over the encoding according to an occupied amount of a virtual buffer, the occupied amount being determined based on the amount of codes generated through the encoding and the amount of codes transferred to an output destination, the video-encoding device comprising:

recording-mode determination means for determining whether or not seamless connection between a preceding chapter and the following chapter that are included in the video signals is feasible and setting an initial value of the occupied amount of the virtual buffer based on the determination result, wherein the recording-mode determination means determines an occupied amount of the virtual buffer immediately before the video signals of the following chapter are transferred to the virtual buffer to be an initial value of the occupied amount of the virtual buffer, where the seamless connection is feasible, and sets the initial value of the occupied amount of the virtual buffer to zero, where the seamless connection is infeasible;

occupied-amount update means for updating the occupied amount of the virtual buffer every time the encoding is performed, wherein the occupied-amount update means determines a predetermined value that is obtained by subtracting the code-for-transfer amount from the occupied amount and adding the generated-code amount to the occupied amount and that is not larger than the maximum value of the virtual buffer to be a new occupied amount, where the occupied amount is larger than the code-for-transfer amount, and determines the generated-code amount to be the new occupied amount, where the occupied amount is equivalent to the code-for-transfer amount or less;

optimum-occupied-amount calculation means for calculating a predetermined optimum occupied amount based on the updated occupied amount of the virtual buffer;

target-code-amount calculation means for calculating a predetermined target-code amount based on the video signals of the following chapter;

target-code-amount adjustment means for adjusting the target code amount so that the sum total of the occupied amount of the virtual buffer and the target code amount does not exceed the optimum occupied amount; and encoding means for performing the encoding based on the adjusted target code amount.

2. The video-encoding device according to claim 1, wherein the optimum-occupied-amount calculation means calculates a predetermined value that is equivalent to and/or as large as the updated occupied amount of the virtual buffer, as the optimum occupied amount.

3. A video-encoding control device for exerting control over encoding based on an occupied amount of a virtual buffer, the occupied amount being determined based on the amount of codes generated at the time where video signals are encoded and the amount of codes transferred to an output destination, the video-encoding control device comprising:

recording-mode determination means for determining whether or not seamless connection between a preceding chapter and the following chapter that are included in the video signals is feasible and setting an initial value of the occupied amount of the virtual buffer based on the determination result, wherein the recording-mode determination means determines an occupied amount of the virtual buffer immediately before the video signals of the following chapter are transferred to the virtual buffer to be an initial value of the occupied amount of the virtual buffer, where the seamless connection is feasible, and sets the initial value of the occupied amount of the virtual buffer to zero, where the seamless connection is infeasible;

occupied-amount update means for updating the occupied amount of the virtual buffer every time the encoding is performed, wherein the occupied-amount update means determines a predetermined value that is obtained by subtracting the code-for-transfer amount from the occupied amount and adding the generated-code amount to the occupied amount and that is not larger than the maximum value of the virtual buffer to be a new occupied amount, where the occupied amount is larger than the code-for-transfer amount, and determines the generated-code amount to be the new occupied amount, where the occupied amount is equivalent to the code-for-transfer amount or less;

optimum-occupied-amount calculation means for calculating a predetermined optimum occupied amount based on the updated occupied amount of the virtual buffer;

target-code-amount calculation means for calculating a predetermined target-code amount based on the video signals of the following chapter; and target-code-amount adjustment means for adjusting the target code amount so that the sum total of the occupied amount of the virtual buffer and the target code amount does not exceed the optimum occupied amount and using the adjusted target code amount for the encoding.

4. The video-encoding control device according to claim 3, wherein the recording-mode determination means determines an occupied amount of the virtual buffer immediately before the video signals of the following chapter are transferred to the virtual buffer to be an initial value of the occupied amount of the virtual buffer, where the seamless connection is feasible, and sets the initial value of the occupied amount of the virtual buffer to zero, where the seamless connection is infeasible.

5. A computer implemented video-encoding control method for exerting control over encoding based on an occupied amount of a virtual buffer, the occupied amount being determined based on the amount of codes generated at the time where video signals are encoded and the amount of codes transferred to an output destination, the video-encoding control method comprising:

determining whether or not seamless connection between a preceding chapter and the following chapter that are included in the video signals is feasible by determining that an occupied amount of the virtual buffer immediately before the video signals of the following chapter are transferred to the virtual buffer to be an initial value of the occupied amount of the virtual buffer, where the seamless connection is feasible, and sets the initial value of the occupied amount of the virtual buffer to zero, where the seamless connection is infeasible;

setting an initial value of the occupied amount of the virtual buffer based on the determination result;

updating the occupied amount of the virtual buffer every time the encoding is performed by updating a predetermined value that is obtained by subtracting the code-for-transfer amount from the occupied amount and adding the generated-code amount to the occupied amount and that is not larger than the maximum value of the virtual buffer to be a new occupied amount, where the occupied amount is larger than the code-for-transfer amount, and determines the generated-code amount to be the new occupied amount, where the occupied amount is equivalent to the code-for-transfer amount or less;

calculating a predetermined optimum occupied amount based on the updated occupied amount of the virtual buffer;

calculating a predetermined target-code amount based on the video signals of the following chapter; and adjusting the target code amount so that the sum total of the occupied amount of the virtual buffer and the target code amount does not exceed the optimum occupied amount and using the adjusted target code amount for the encoding.

6. A computer implemented video-encoding control method for exerting control over encoding based on an occupied amount of a virtual buffer, the occupied amount being determined based on the amount of codes generated at the time where video signals are encoded and the amount of codes transferred to an output destination, the video-encoding control method comprising:

determining whether or not seamless connection between a preceding chapter and the following chapter that are included in the video signals is feasible;

determining an occupied amount of the virtual buffer immediately before the video signals of the following chapter are transferred to the virtual buffer to be an initial value of the occupied amount of the virtual buffer, where it is determined that the seamless connection is feasible based on the determination result, and setting the initial value of the occupied amount of the virtual buffer to zero, where it is determined that the seamless connection is infeasible;

updating the occupied amount of the virtual buffer every time the encoding is performed by updating a predetermined value that is obtained by subtracting the code-for-transfer amount from the occupied amount and adding the generated-code amount to the occupied amount and that is not larger than the maximum value of the virtual buffer to be a new occupied amount, where the occupied amount is larger than the code-for-transfer amount, and determines the generated-code amount to be the new occupied amount, where the occupied amount is equivalent to the code-for-transfer amount or less;

calculating a predetermined optimum occupied amount based on the updated occupied amount of the virtual buffer;

calculating a predetermined target-code amount based on the video signals of the following chapter; and adjusting the target code amount so that the sum total of the occupied amount of the virtual buffer and the target code amount does not exceed the optimum occupied amount and using the adjusted target code amount for the encoding.

7. A computer program product comprising a tangible computer readable medium including program code thereon, for exerting control over encoding based on an occupied amount of a virtual buffer, the occupied amount being determined based on the amount of codes generated at the time where video signals are encoded and the amount of codes transferred to an output destination, the program code being executable to perform operations comprising:

determining whether or not seamless connection between a preceding chapter and the following chapter that are included in the video signals is feasible by determining that an occupied amount of the virtual buffer immediately before the video signals of the following chapter are transferred to the virtual buffer to be an initial value of the occupied amount of the virtual buffer, where the seamless connection is feasible, and sets the initial value of the occupied amount of the virtual buffer to zero, where the seamless connection is infeasible;

determining an initial value of the occupied amount of the virtual buffer based on the determination result;

updating the occupied amount of the virtual buffer every time the encoding is performed by updating a predetermined value that is obtained by subtracting the code-for-transfer amount from the occupied amount and adding the generated-code amount to the occupied amount and that is not larger than the maximum value of the virtual buffer to be a new occupied amount, where the occupied amount is larger than the code-for-transfer amount, and determines the generated-code amount to be the new occupied amount, where the occupied amount is equivalent to the code-for-transfer amount or less;

calculating a predetermined optimum occupied amount based on the updated occupied amount of the virtual buffer;

calculating a predetermined target-code amount based on the video signals of the following chapter; and adjusting the target code amount so that the sum total of the occupied amount of the virtual buffer and the target code amount does not exceed the optimum occupied amount and using the adjusted target code amount for the encoding.

8. A computer program product comprising a tangible computer readable medium including program code thereon, for exerting control over encoding based on an occupied amount of a virtual buffer, the occupied amount being determined based on the amount of codes generated at the time where video signals are encoded and the amount of codes transferred to an output destination, the program code being executable to perform operations comprising:

determining whether or not seamless connection between a preceding chapter and the following chapter that are included in the video signals is feasible;

determining an occupied amount of the virtual buffer immediately before the video signals of the following chapter are transferred to the virtual buffer to be an initial value of the occupied amount of the virtual buffer, where it is determined that the seamless connection is feasible based on the determination result, and setting the initial value of the occupied amount of the virtual buffer to zero, where it is determined that the seamless connection is infeasible;

updating the occupied amount of the virtual buffer every time the encoding is performed by updating a predetermined value that is obtained by subtracting the code-for-transfer amount from the occupied amount and adding the generated-code amount to the occupied amount and that is not larger than the maximum value of the virtual buffer to be a new occupied amount, where the occupied amount is larger than the code-for-transfer amount, and determines the generated-code amount to be the new occupied amount, where the occupied amount is equivalent to the code-for-transfer amount or less;

calculating a predetermined optimum occupied amount based on the updated occupied amount of the virtual buffer;

calculating a predetermined target-code amount based on the video signals of the following chapter; and adjusting the target code amount so that the sum total of the occupied amount of the virtual buffer and the target code amount does not exceed the optimum occupied amount and using the adjusted target code amount for the encoding.

* * * * *